(12) United States Patent
Reddy

(10) Patent No.: US 7,967,070 B2
(45) Date of Patent: Jun. 28, 2011

(54) DIVERLESS CONNECTOR FOR BEND RESTRICTORS AND/OR BEND STIFFENERS

(75) Inventor: Sanjay Konda Reddy, Houston, TX (US)

(73) Assignee: Deep Sea Technologies, Inc., Houston, TX (US)

( * ) Notice: Subject to any disclaimer, the term of this patent is extended or adjusted under 35 U.S.C. 154(b) by 895 days.

(21) Appl. No.: 11/776,826

(22) Filed: Jul. 12, 2007

(65) Prior Publication Data

US 2008/0087435 A1      Apr. 17, 2008

Related U.S. Application Data

(60) Provisional application No. 60/807,090, filed on Jul. 12, 2006.

(51) Int. Cl.
E21B 29/12 (2006.01)

(52) U.S. Cl. ........ 166/341; 166/343; 166/360; 166/349; 285/920

(58) Field of Classification Search .................. 166/338, 166/339, 340, 341, 342, 343, 344, 367, 368, 166/345, 346, 349; 285/322, 81, 920
See application file for complete search history.

(56) References Cited

U.S. PATENT DOCUMENTS

| | | | | |
|---|---|---|---|---|
| 3,032,125 A * | 5/1962 | Hiser et al. | | 175/7 |
| 3,332,484 A * | 7/1967 | Watkins | | 166/338 |
| 3,486,556 A * | 12/1969 | Burgess | | 166/338 |
| 4,024,718 A * | 5/1977 | Roche et al. | | 405/190 |
| 4,133,182 A * | 1/1979 | Chateau | | 405/169 |
| 4,893,677 A * | 1/1990 | Brammer et al. | | 166/341 |
| 5,279,369 A * | 1/1994 | Brammer | | 166/368 |
| 5,794,700 A | 8/1998 | Pollack | | |
| 6,098,715 A * | 8/2000 | Seixas et al. | | 166/347 |
| 6,220,303 B1 | 4/2001 | Secher et al. | | |
| 6,336,508 B1 * | 1/2002 | Guinn | | 166/339 |
| 6,688,930 B2 | 2/2004 | Cottrell et al. | | |
| 6,834,892 B2 * | 12/2004 | Kornau et al. | | 285/364 |
| 6,902,199 B2 * | 6/2005 | Colyer et al. | | 285/29 |
| 7,032,673 B2 * | 4/2006 | Dezen et al. | | 166/341 |
| 7,044,228 B2 | 5/2006 | Langford et al. | | |
| 7,143,830 B2 * | 12/2006 | Bartlett | | 166/339 |
| 7,402,000 B2 * | 7/2008 | Bastesen et al. | | 405/170 |
| 7,467,662 B2 * | 12/2008 | Smith | | 166/343 |
| 7,503,391 B2 * | 3/2009 | McCanna et al. | | 166/343 |
| 2004/0226722 A1 * | 11/2004 | Colyer et al. | | 166/345 |
| 2005/0269102 A1 * | 12/2005 | McCanna et al. | | 166/345 |

OTHER PUBLICATIONS

Flotation Technologies InFlex bend limiters product web page (www.flotec.com/flo24.html), date unknown, 2 pages.

* cited by examiner

*Primary Examiner* — Thomas A Beach

(74) *Attorney, Agent, or Firm* — Meyertons, Hood, Kivlin, Kowert & Goetzel, P.C.; Eric B. Meyertons

(57) ABSTRACT

A subsea connector is disclosed. The connector includes a guide funnel assembly that may be coupled to a subsea structure. The guide funnel assembly may receive a shaft. The shaft may be coupled to a bend restrictor/limiter or a bend stiffener. The shaft may be received inside the guide funnel assembly. The shaft may include a recess. A latch assembly may be coupled to the guide funnel assembly. The latch assembly may include one or more dogs and a latch operating device. The dogs may be radially moveable in and out of the interior of the guide funnel assembly. The dogs may be inserted into the recess of the shaft to inhibit longitudinal axial movement between the shaft and the guide funnel assembly. The latch operating device may control the in and out radial movement of the dogs.

24 Claims, 3 Drawing Sheets

DIVERLESS CONNECTOR FOR BEND RESTRICTORS AND/OR BEND STIFFENERS

PRIORITY CLAIM

This patent application claims priority to U.S. Provisional Patent No. 60/807,090 entitled "DIVERLESS CONNECTOR FOR BEND RESTRICTORS/BEND LIMITERS" to Reddy filed on Jul. 12, 2006.

BACKGROUND

1. Field of the Invention

The present invention relates to subsea connectors and devices for limiting the bend of flexible pipes or umbilicals used with subsea connections. More particularly, the invention relates to subsea bend restrictors/limiters and/or bend stiffeners that are installable using remotely operated vehicles (ROVs).

2. Description of Related Art

Bend restrictors (or bend limiters) and/or bend stiffeners are used to inhibit overbending of flexible pipes or cable, flowline, and/or umbilical risers where the risers attach to fixed or floating structures such as, but not limited to, subsea riser bases, wellhead connections, pipeline end manifolds (PLEMs), and fixed or floating offshore platforms. The flexible pipes, flowlines, and/or umbilicals may be used, for example, to transport hydrocarbons or other fluids, to and from the surface. As an example, a bend restrictor/limiter may be used to inhibit overbending of an umbilical riser exiting an I- or J-tube on an offshore platform.

A bend restrictor/limiter may fit snugly over the riser and be tapered on the outside with a passage on the inside to allow the riser to pass through the bend restrictor/limiter. One end of the bend restrictor/limiter may be coupled to (e.g., secured or attached to) the riser base (e.g., the I- or J-tube) while the other end is freely moving. This structure allows the riser to move axially within the bend restrictor/limiter while lateral movement of the riser is inhibited by engaging the inside walls of the bend restrictor/limiter.

The riser may move laterally due to forces such as current or wave action. The stiffness provided by the bend restrictor/limiter limits the curvature of the riser and ensures that the curvature stays within a maximum curvature allowed by the design of the riser. This curvature limitation protects the riser from overbending and/or kinking.

In most subsea operations, the bend restrictor/limiter is installed with the riser at the time of offshore installation. The bend restrictor/limiter may be placed below the riser pullhead and inhibited from sliding down by, for example, a temporary hold back clamp installed on the riser. One end of the bend restrictor/limiter typically terminates in a flange that matches the flange on the structure (e.g., the flange on the end of the I- or J-tube).

During the riser pull-in and hang-off operations, a diver typically connects the flange on the bend restrictor/limiter to the flange on the structure. The diver may also remove the holdback clamp after connecting the flanges.

Using the diver to connect the bend restrictor/limiter has certain risks and dangers associated with people operating heavy machinery in a subsea environment. In addition, there are certain logistical, commercial, and operational risks associated with coordinating installation activity with diving activity. Diving activity and support associated with the diving activity may also be expensive and increase the costs of installation of the bend restrictor/limiter. Diver installation also may be slow and tedious, which may also increase costs and delay times for structure operation due to waiting for the diving operation to be completed.

Thus, there is a need for a subsea connector for bend restrictors/limiters that is installable without the need for using human divers. Specifically, a subsea connector for bend restrictors/limiters that is installable using automated systems such as, but not limited to, a remotely operated vehicle (ROV) may be advantageous. Having an ROV installable connector for bend restrictors/limiters would eliminate the need for diving operations and the associated risks and dangers to people (e.g., divers). The ROV installable connector for bend restrictors/limiters may also reduce logistical, commercial, and operational risks by eliminating the need to coordinate installation activity with diving activity. The ROV installable connector for bend restrictors/limiters may also reduce installation costs associated with diving activity and diving activity support. The ROV installable connector for bend restrictors/limiters may also improve the speed of operations and reduce costs by decreasing installation and connection time for the bend restrictor/limiter.

SUMMARY

In certain embodiments, a subsea connector includes a guide funnel assembly. The assembly may be coupled to a subsea structure. The assembly may receive a shaft. The shaft may be coupled to a bend restrictor/limiter. The shaft may be received inside the guide funnel assembly. The shaft may include a recess. A latch assembly may be coupled to the guide funnel assembly. The latch assembly may include one or more dogs and a latch operating device. The dogs may be radially moveable in and out of the interior of the guide funnel assembly. In certain embodiments, the dogs are inserted into the recess of the shaft to inhibit longitudinal axial movement between the shaft and the guide funnel assembly. The latch operating device may control the in and out radial movement of the dogs.

In certain embodiments, the connector is installed using a remotely operated vehicle (ROV). The latch operating device may be manipulated using the ROV. In some embodiments, the latch assembly is positioned to allow the dogs to move radially in and out of the interior of the guide funnel assembly with an inward bias. In some embodiments, the latch assembly is positioned to allow the shaft to be inserted into the guide funnel assembly. In some embodiments, the latch assembly includes a locking mechanism to inhibit the dogs from moving radially outward when the dogs are inserted into the recess of the shaft. In some embodiments, the latch assembly includes an unlocking mechanism that engages the dogs to move the dogs radially outward when the unlocking mechanism is activated.

In certain embodiments, the latch assembly includes one or more dogs and a cam plate. The dogs may be radially moveable in and out of the interior of the guide funnel assembly. The cam plate may include one or more cam surfaces. Movement of the cam plate may control the in and out radial movement of the dogs.

In some embodiments, at least one of the cam surfaces defines at least one radial position of the dogs. In some embodiments, the cam plate is moved using the ROV. In some embodiments, the cam plate includes at least one cam surface that allows the dogs to move radially in and out of the interior of the guide funnel assembly with an inward bias. In some embodiments, the cam plate includes at least one cam surface that allows the shaft to be inserted into the guide funnel assembly. In some embodiments, the cam plate includes at least one cam surface that inhibits the dogs from moving radially outward when the dogs are inserted into the recess of the shaft. In some embodiments, the cam plate includes at least one cam surface that moves the dogs radially outward when the cam plate is moved to engage such cam surface.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figures 1, 1A:
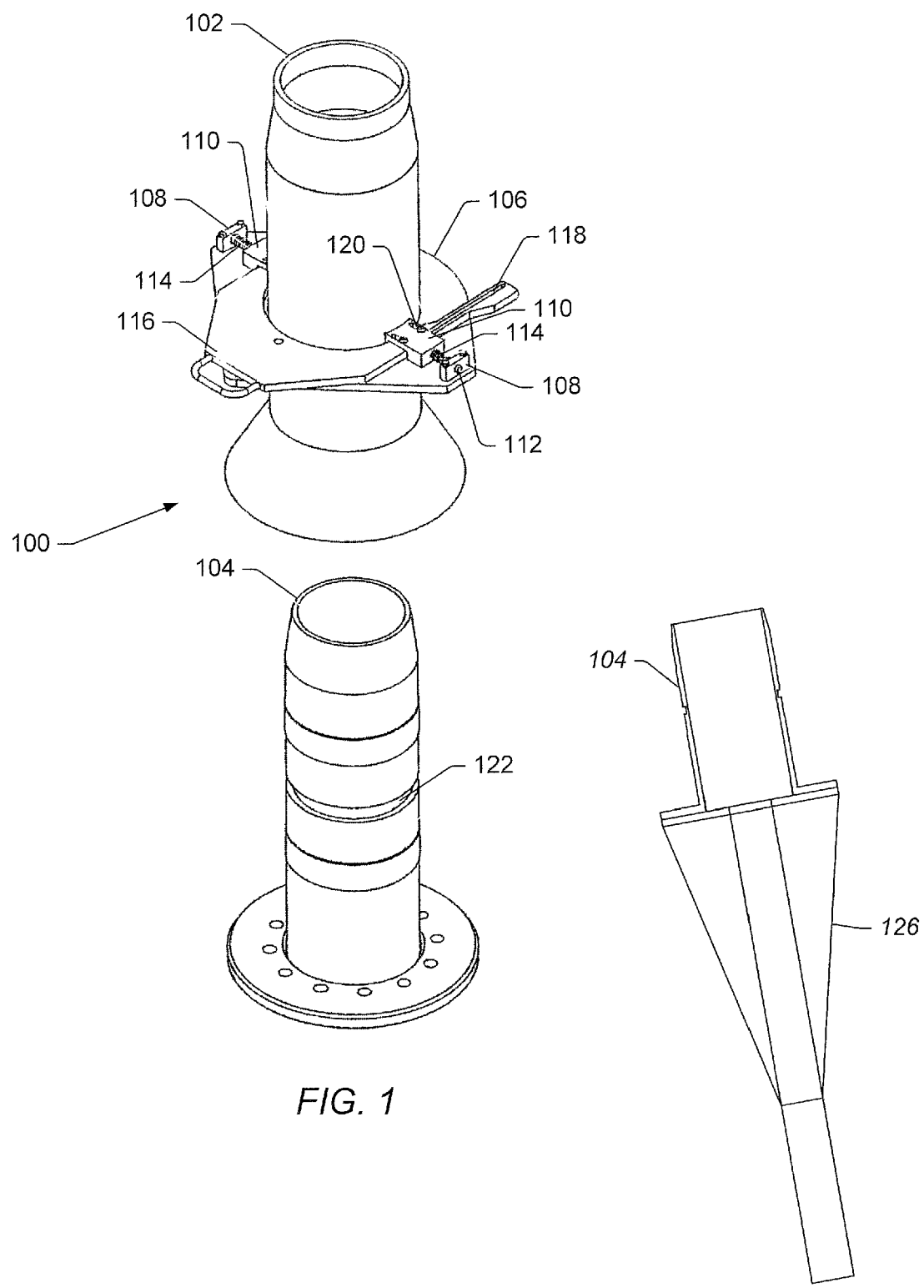
FIG. 1 depicts a representation of an embodiment of a connector that may be used for connecting bend restrictors/limiters to a structure in a subsea environment.
FIG. 1A depicts a representation of an embodiment of a shaft coupled to a bend restrictor/limiter.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

In the context of this patent, the terms "latching dog" and "dog" refer to any mechanical device for holding, gripping, and/or fastening that comprises a spike, bar, hook, deadbolt, pin, or the like. The term "bend restrictor/limiter" refers to both a bend restrictor/limiter and a bend stiffener. Thus, a connector for a bend restrictor/limiter is also a connector for a bend stiffener and vice versa.

FIG. 1 depicts a representation of an embodiment of connector 100 that may be used for connecting bend restrictors/limiters and/or bend stiffeners to a structure in a subsea environment. Connector 100 includes guide funnel assembly 102 and shaft 104. Assembly 102 and shaft 104 may have shapes that allow the shaft to be received in the assembly (e.g., the shaft can be inserted into the interior volume of the assembly). In certain embodiments, assembly 102 is coupled to a subsea portion of a fixed or floating structure (e.g., an offshore platform or a subsea riser base). For example, assembly 102 may be coupled to an end of an I- or J-tube flange on an offshore platform. Assembly 102 may be coupled to the structure, for example, by either bolting or welding the assembly to the structure. In certain embodiments, shaft 104 is coupled to a bend restrictor/limiter. FIG. 1A depicts a representation of an embodiment of shaft 104 coupled to bend restrictor/limiter 126. Shaft 104 may be coupled to the bend restrictor/limiter, for example, by bolting or welding the shaft to bend restrictor/limiter 126. In the embodiment depicted in FIG. 1, assembly 102 is configured to be welded to the structure and shaft 104 is configured to be bolted to the bend restrictor/limiter.

In certain embodiments, a latch assembly is coupled to assembly 102. In certain embodiments, the latch assembly includes base plate 106, cam plate 116, and/or other components described herein that operate to latch assembly 102 to shaft 104. Base plate 106 may be substantially flat or be of another suitable shape. In certain embodiments, base plate 106 is welded to assembly 102. Spring retainers 108 may be coupled to base plate 106. Spring retainers 108 may, for example, be bolted or otherwise attached to base plate 106.

Assembly 102 may include one or more slots in the side of the assembly to allow latching dogs 110 to slide in and out through the walls of the assembly. The slots may be machined or otherwise formed in the side of assembly 102. In certain embodiments, assembly 102 includes two slots on opposite sides of the assembly.

Dogs 110 may be guided by guides 112. Guides 112 may be shoulder bolts and/or other suitable devices for guiding dogs 110. Shoulder bolts may be screwed into dogs 110 to secure the bolts to the dogs. Examples of other suitable devices for guides that may be used in combination with shoulder bolts or instead of shoulder bolts include, but are not limited to, screws, slots, pins, springs, and grooves.

Guides 112 may pass through spring retainers 108. Springs 114 may be installed over guides 112 so that the springs lay between spring retainers 108 and dogs 110. Springs 114 may provide a biasing force between spring retainers 108 and dogs 110 that urges the dogs radially inwards towards walls of assembly 102. Springs 114 are compressed as dogs 110 slide out of the slots in the side of assembly 102. In some embodiments, other biasing devices may be used in combination with springs 114 or instead of the springs.

In certain embodiments, cam plate 116 slidably couples to base plate 106. Cam plate 116 may mate to the shape and/or surface of base plate 106 so that the cam plate and the base plate are slidably engaged. Cam plate 116 may be used to control movement of dogs 110. In some embodiments, multiple cam plates and/or other suitable structures are used to control the movement of dogs. Other suitable structures include, but are not limited to, hydraulic pistons, gears, and cranks. Additionally, cam plate 116 and/or other suitable structures for moving dogs 110 may be coupled to base plate 106 and/or assembly 102 in ways other than shown in FIG. 1 that may facilitate operation of the dogs.

Cam plate 116 controls the radial movement of dogs 110 on assembly 102 so that the cam plate controls the sliding of the dogs in and out of the slots on the sides of the assembly. In certain embodiments, cam plate 116 includes grooves or slots 118 shaped into the legs of the cam plate. Slots 118 may slidably couple to guides 120 (e.g., shoulder bolts or other suitable structures) attached to base plate 106. Guides 120 may also slidably couple dogs 110 to base plate 106. Dogs 110 may have an interior slot through which legs of cam plate 116 are received. Guides 120 may guide the radial inward and outward movement of dogs 110 while allowing and guiding radial movement of cam plate 116 towards and away from assembly 102.

In certain embodiments, cam plate 116 includes three cam surfaces on the legs of the cam plate. In some embodiments, other numbers of cam surfaces are included on the surfaces of the cam plate and/or the legs of the cam plate. The cam surfaces may engage the interior of the slots on dogs 110 to control the radial position of the dogs. In certain embodiments, the three cam surfaces are used to position dogs 110 in three different positions. The three positions: the "install position" depicted in FIGS. 2-4; the "lock position" depicted in FIG. 5; and the "remove position" depicted in FIG. 6.

Figure 6:
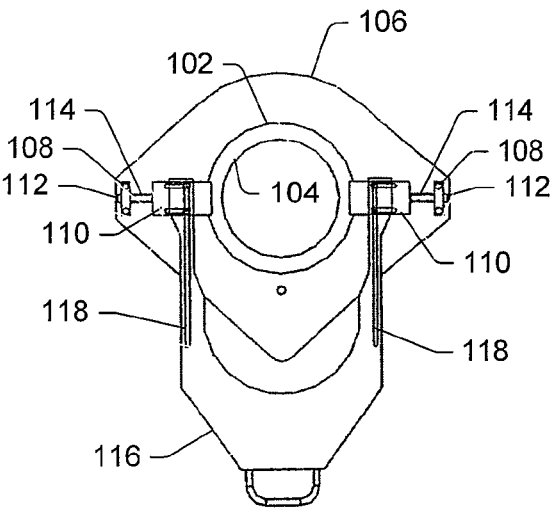
FIG. 6 depicts a top view of an embodiment of a connector in the remove position.

In certain embodiments, the legs of cam plate 116 have first cam surfaces on outer sides of the legs and at or near the ends of the legs that are used to move dogs 110 radially outwards for the remove position (shown in FIG. 6). Adjacent second cam surfaces on the outer sides of the legs of cam plate 116 are used for the install position (depicted in FIGS. 2-4). The second cam surfaces in the install position allow dogs 110 to move radially inward to follow the outer surface of shaft 104 as the shaft moves along the inside of assembly 102. Dogs 110 may lock into a desired position on shaft 104 when the dogs engage one or more grooves on the shaft. Assembly 102 is secured to shaft 104 when dogs 110 lock into the desired position.

Third cam surfaces are located on the opposite side of the first cam surfaces on the legs of cam plate 116. The third cam surfaces are disposed on the inward sides of the legs (the sides closest to assembly 102). The third cam surfaces force dogs 110 inwards to a locked position when cam plate 116 is moved radially towards assembly 102 (e.g., towards the lock position depicted in FIG. 5).

Figure 5:
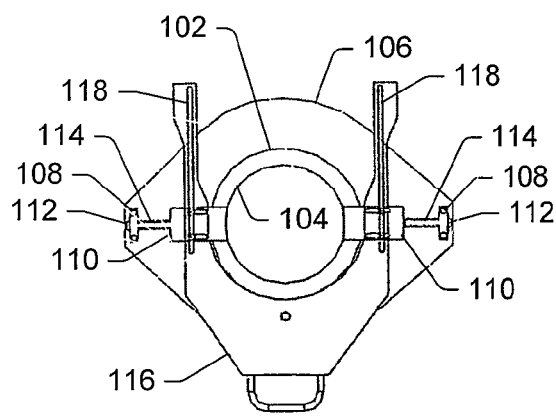
FIG. 5 depicts a top view of an embodiment of a connector in the lock position.

Inward movement of cam plate 116 may be limited or stopped when an inner surface of the cam plate presses against assembly 102 (e.g., when cam plate 116 reaches the lock position depicted in FIG. 5). Outward movement of cam plate 116 may be limited or stopped by the end of the slots or grooves in the legs of the cam plate so that the cam plate cannot be pulled off assembly 102 (e.g., when cam plate 116 reaches the remove position depicted in FIG. 6).

In some embodiments, connector 100 and its associated components such as, but not limited to, cam plate 116, assembly 102, and shaft 104 include visual markings, colors, and/or other visual enhancements as desired so that an operator of an ROV ("remotely operated vehicle") may easily view the position and/or operation of the connector including operation of the cam plate. In some embodiments, cam plate 116 includes a handle, latch, or other grasping device that is easily engaged by the ROV so that the ROV may easily move and/or operate the cam plate, which controls operation of dogs 110. In some embodiments, cam plate 116 is coupled to a screw drive, torque device (e.g., torque bucket), or other mechanical device that facilitates the movement and/or operation of the cam plate and dogs 110. Such devices may be operated by the ROV to move and/or operate cam plate 116.

In certain embodiments, shaft 104 includes recess 122 (depicted in FIG. 1). Recess 122 may include grooves, holes, slots, notches, or other suitable recesses on the outer surface of the shaft so that dogs 110 can extend into the recess when assembly 102 is properly aligned with the shaft. When dogs 110 are extended into recess 122, shaft 104 is locked into position within assembly 102.

Figure 2:
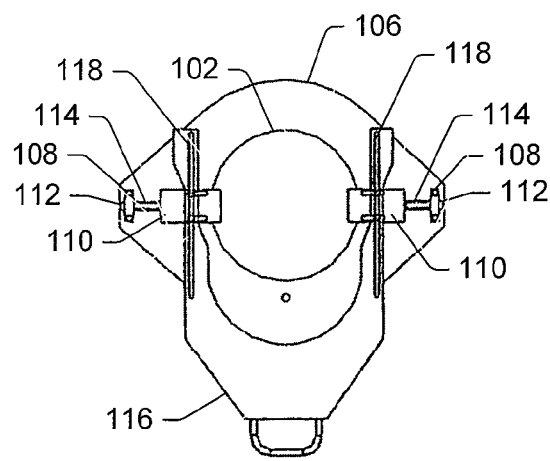
FIG. 2 depicts a top view of an embodiment of a connector in the install position before a shaft is inserted into an assembly.
Figure 3:
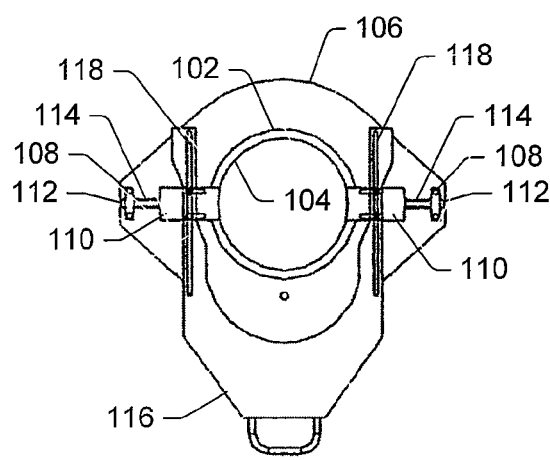
FIG. 3 depicts a top view of an embodiment of a connector in the install position as a shaft is being inserted into an assembly.
Figure 4:
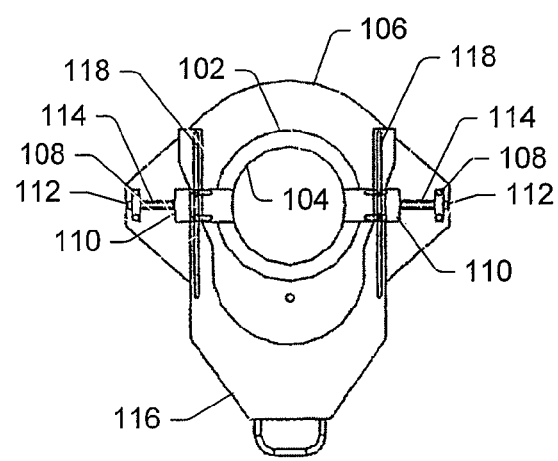
FIG. 4 depicts a top view of an embodiment of a connector in the install position with a shaft fully inserted into an assembly.
Figure 7:
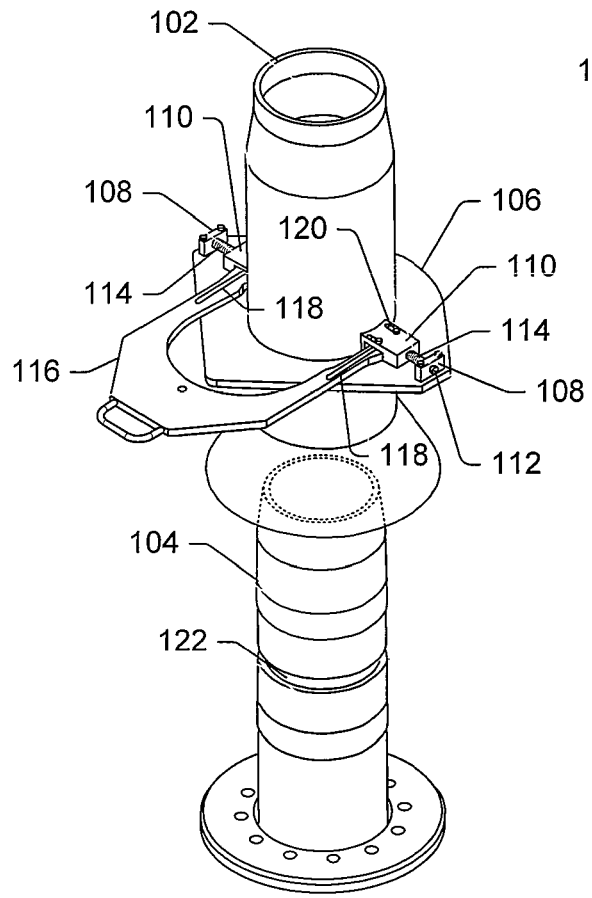
FIG. 7 depicts a representation of an embodiment of a connector in the install position before a shaft is inserted into an assembly.
Figure 8:
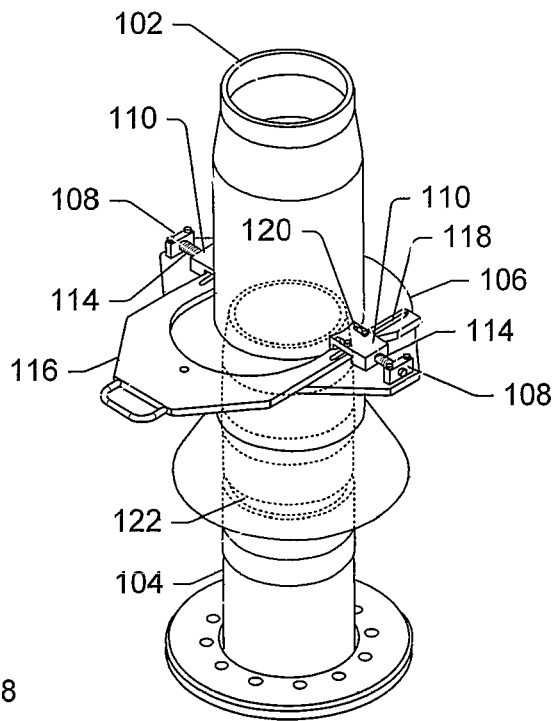
FIG. 8 depicts a representation of an embodiment of a connector in the install position as a shaft is being inserted into an assembly.

FIGS. 2-4 and 7-9 depict embodiments of connector 100 in the install position. FIGS. 2 and 7 depict an embodiment of connector 100 in the install position before shaft 104 is inserted into assembly 102. In the install position, cam plate 116 is positioned such that dogs 110 are free to move in and out of the slots on assembly 102 within the limits of guides 120. Springs 114 provide tension to extend dogs 110 into the slots on assembly 102. FIGS. 3 and 8 depict an embodiment of connector 100 in the install position as shaft 104 is being inserted into assembly 102. Dogs 110 move back and forth while following the outer surface profile of shaft 104 as the shaft is inserted into assembly 102. FIG. 4 depicts an embodiment of connector 100 in the install position with shaft 104 fully inserted into assembly 102 and dogs 110 snap into the recess on the shaft due to the force of springs 114.

Figure 9:
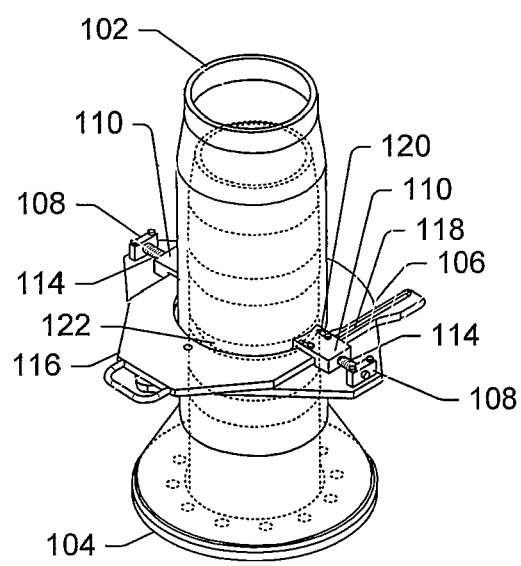
FIG. 9 depicts a representation of an embodiment of a connector in the lock position.

After dogs 110 snap into recess 122 on shaft 104, cam plate 116 may be moved to the lock position. FIGS. 5 and 9 depict an embodiment of connector 100 in the lock position. In FIGS. 5 and 9, cam plate 116 has been moved inward towards shaft 104 along guides 118 so that dogs 110 are locked into place. In the lock position, dogs 110 are inhibited from retracting out of the recess on shaft 104 by the third cam surfaces on the legs of cam plate 116. In the lock position, longitudinal axial movement between shaft 104 and assembly 102 is inhibited (e.g., the shaft and the assembly, as depicted in FIG. 9, are inhibited from moving up and down relative to each other).

To unlock and remove shaft 104 from assembly 102, cam plate 116 is moved to the remove position. FIG. 6 depicts an embodiment of connector 100 in the remove position. Cam plate 116 is moved (e.g., pulled) to the position shown in FIG. 6 by, for example, an arm of the ROV. In this position, springs 114 are compressed and dogs 110 are moved out of the recess on shaft 104. Moving dogs 110 out of the recess allows assembly 102 and shaft 104 to be pulled apart.

In certain embodiments, the weight of the bend restrictor/limiter, shaft 104, and any associated couplings is taken up by dogs 110. When lateral loads act on the riser, bending loads are transmitted through shaft 104 into assembly 102 due to the close tolerance between the shaft and the assembly. Contact points between shaft 104 and assembly 102 may be located on either side of the location of dogs 110.

In some alternative embodiments, other mechanisms than those described above are used for securing (e.g., latching) shaft 104 inside assembly 102. In one embodiment, a hinged circular ring with dogs 110 coupled on the inside of the ring replaces cam plate 116. An open end of the ring may be coupled together by a screw drive. The screw drive may be operated (e.g., actuated) by the ROV manipulator or a torque tool to drive the dogs.

In some embodiments, hard rubber dogs may be used instead of and/or in combination with metal (e.g., steel) dogs in the above-described latching assemblies or in other similar operating assemblies. The hard rubber dogs may provide vibration dampening for connector 100.

In some embodiments, a circular or ring-shaped cam plate with interior cam surfaces that act similarly to the cam surfaces described above may be used in the latch assembly. The interior cam surfaces may act to drive the dogs through one or all of the positions described above (e.g., the install, lock, and/or remove positions). Rotation of such a cam plate may move the dogs through the various positions.

In some embodiments, a cam plate may be shaped as a ring or otherwise shaped so that when the cam plate is moved up and down parallel to the longitudinal axis of assembly 102, the cam plate operates to latch and unlock the dogs as described above.

In some embodiments, a clamp, a three-part clamp, a plate, a sliding lock, or any other suitable locking device may be used instead of and/or in combination with dogs 110 in the latch assembly.

While cam surfaces have been described herein as devices for operating dogs 110. It is to be understood that other devices such as, but not limited to, worm gears, drive nuts, torque drives, handles, and/or other mechanical drives that can be operated by the ROV may be used. Additionally, while three positions are shown herein (install, lock, and remove), not all these positions are necessary in all embodiments described herein and/or other positions may be designed into the operation of connector 100 and used as desired.

It is to be understood the installation of connector 100 is not limited to particular methods (e.g., installation without divers or installation by the ROV) described above which may, of course, vary. Other methods and/or equipment known in the art or developed for use in the art may be used to install and operate connector 100 and the latch assembly without divers.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a spring" includes a combination of two or more springs.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A subsea connector, comprising:
    a guide funnel assembly coupled to a subsea structure during use, the guide funnel assembly being configured to receive a shaft;
    the shaft coupled to a bend restrictor/limiter during use, the shaft being configured to be received inside the guide funnel assembly, wherein the shaft comprises a recess;
    a latch assembly coupled to the guide funnel assembly, the latch assembly comprising one or more dogs and a latch operating device, wherein the latch operating device comprises a base and a cam plate attached to the guide funnel assembly;
    wherein the dogs are radially moveable in and out of the interior of the guide funnel assembly, and wherein the dogs are configured to be inserted into the recess of the shaft to inhibit longitudinal axial movement between the shaft and the guide funnel assembly; and
    wherein the latch operating device is configured to control the in and out radial movement of the dogs.

2. The connector of claim 1, wherein the connector is configured to be installed using a remotely operated vehicle (ROV).

3. The connector of claim 1, wherein the latch operating device is configured to be manipulated using an ROV.

4. The connector of claim 1, wherein the latch assembly is configured to be positioned to allow the dogs to move radially in and out of the interior of the guide funnel assembly with an inward bias.

5. The connector of claim 1, wherein the latch assembly is configured to be positioned to allow the shaft to be inserted into the guide funnel assembly.

6. The connector of claim 1, wherein the latch assembly comprises a locking mechanism to inhibit the dogs from moving radially outward when the dogs are inserted into the recess of the shaft.

7. The connector of claim 1, wherein the latch assembly comprises an unlocking mechanism that engages the dogs to move the dogs radially outward when the unlocking mechanism is activated.

8. The connector of claim 1, wherein the guide funnel assembly is coupled to a riser tube on the subsea structure during use.

9. The connector of claim 1, wherein the bend restrictor/limiter is coupled to a riser during use.

10. A subsea connector, comprising:
    a guide funnel assembly configured to be coupled to a subsea structure, the guide funnel assembly being configured to receive a shaft;
    the shaft configured to be coupled to a bend restrictor/limiter, the shaft being configured to be received inside the guide funnel assembly, wherein the shaft comprises a recess;
    a latch assembly coupled to the guide funnel assembly, the latch assembly comprising one or more dogs and a cam plate;
    wherein the dogs are radially moveable in and out of the interior of the guide funnel assembly, and wherein the dogs are configured to be inserted into the recess of the shaft to inhibit longitudinal axial movement between the shaft and the guide funnel assembly; and
    wherein the cam plate comprises one or more cam surfaces, and wherein movement of the cam plate controls the in and out radial movement of the dogs.

11. The connector of claim 10, wherein at least one of the cam surfaces defines at least one radial position of the dogs.

12. The connector of claim 10, wherein the cam plate is configured to be moved using an ROV.

13. The connector of claim 10, wherein the cam plate comprises at least one cam surface that allows the dogs to move radially in and out of the interior of the guide funnel assembly with an inward bias.

14. The connector of claim 10, wherein the cam plate comprises at least one cam surface that allows the shaft to be inserted into the guide funnel assembly.

15. The connector of claim 10, wherein the cam plate comprises at least one cam surface that inhibits the dogs from moving radially outward when the dogs are inserted into the recess of the shaft.

16. The connector of claim 10, wherein the cam plate comprises at least one cam surface that moves the dogs radially outward when the cam plate is moved to engage such cam surface.

17. The connector of claim 10, wherein the guide funnel assembly is coupled to a riser tube on the subsea structure during use.

18. The connector of claim 10, wherein the shaft is configured to be coupled to a bend stiffener during use.

19. A subsea connector for coupling a subsea structure to a bend restrictor/limiter, comprising:
- a guide funnel assembly configured to receive a shaft;
- the shaft coupled to the bend restrictor/limiter during use, the shaft being configured to be received inside the guide funnel assembly, wherein the shaft comprises a recess;
- a latch assembly coupled to the guide funnel assembly, the latch assembly comprising one or more dogs and a latch operating device, wherein the latch operating device comprises a base and a cam plate attached to the guide funnel assembly;
- wherein the dogs are radially moveable in and out of the interior of the guide funnel assembly, and wherein the dogs are configured to be inserted into the recess of the shaft to inhibit longitudinal axial movement between the shaft and the guide funnel assembly; and
- wherein the latch operating device is configured to control the in and out radial movement of the dogs.

20. The connector of claim 19, wherein the guide funnel assembly is configured to be coupled to the subsea structure during use.

21. The connector of claim 19, wherein the connector is configured to be installed using a remotely operated vehicle (ROV).

22. The connector of claim 19, wherein the latch assembly comprises a locking mechanism to inhibit the dogs from moving radially outward when the dogs are inserted into the recess of the shaft.

23. The connector of claim 19, wherein the latch assembly comprises an unlocking mechanism that engages the dogs to move the dogs radially outward when the unlocking mechanism is activated.

24. The connector of claim 19, wherein the guide funnel assembly is coupled to a riser tube on the subsea structure during use.

\* \* \* \* \*